United States Patent
Chong et al.

(10) Patent No.: US 10,817,420 B2
(45) Date of Patent: Oct. 27, 2020

(54) APPARATUS AND METHOD TO ACCESS A MEMORY LOCATION

(71) Applicant: Arm Limited, Cambridge (GB)

(72) Inventors: Yew Keong Chong, Austin, TX (US); Sriram Thyagarajan, Austin, TX (US); Andy Wangkun Chen, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/175,151

(22) Filed: Oct. 30, 2018

(65) Prior Publication Data
US 2020/0133850 A1   Apr. 30, 2020

(51) Int. Cl.
*G06F 12/06*   (2006.01)
*G06F 12/02*   (2006.01)

(52) U.S. Cl.
CPC ...... *G06F 12/0638* (2013.01); *G06F 12/0223* (2013.01); *G06F 2212/1016* (2013.01)

(58) Field of Classification Search
CPC ............. G06F 12/0638; G06F 12/0223; G06F 2212/1016; G11C 5/025
See application file for complete search history.

(56) References Cited

U.S. PATENT DOCUMENTS

| | | | | | |
|---|---|---|---|---|---|
| 5,911,153 | A * | 6/1999 | Dhong | ................ | G06F 12/0864 711/213 |
| 7,287,145 | B1 * | 10/2007 | Simeral | ............... | G06F 12/0223 711/200 |
| 7,318,114 | B1 * | 1/2008 | Cypher | ............... | G06F 12/0607 711/127 |
| 7,418,571 | B2 * | 8/2008 | Wolrich | ............. | G06F 12/0607 711/157 |
| 7,817,470 | B2 * | 10/2010 | Kim | ........................ | G11C 5/025 365/185.11 |
| 9,646,656 | B2 * | 5/2017 | Gupta | .................... | G11C 5/066 |
| 10,109,344 | B2 * | 10/2018 | Kang | .................... | G11C 5/025 |

(Continued)

OTHER PUBLICATIONS

Jae-Hong Kim, A Methodology for Extracting Performance Parameters in SSDs, 2009 IEEE International Symposium on Modeling, Analysis & Simulation of Computer and Telecommunication Systems (pp. 1-10) (Year: 2009).*

(Continued)

*Primary Examiner* — Khoa D Doan
(74) *Attorney, Agent, or Firm* — Pramudji Law Group PLLC; Ari Pramudji

(57) ABSTRACT

A method for accessing two memory locations in two different memory arrays based on a single address string includes determining three sets of address bits. A first set of address bits are common to the addresses of wordlines that correspond to the memory locations in the two memory arrays. A second set of address bits concatenated with the first set of address bits provides the address of the wordline that corresponds to a first memory location in a first memory array. A third set of address bits concatenated with the first set of address bits provides the address of the wordline that corresponds to a second memory location in a second memory array. The method includes populating the single address string with the three sets of address bits and may be performed by an address data processing unit.

18 Claims, 7 Drawing Sheets

(56) References Cited

U.S. PATENT DOCUMENTS

| | | | | |
|---|---|---|---|---|
| 2001/0010642 | A1* | 8/2001 | Naffziger | G11C 8/10 365/154 |
| 2003/0188251 | A1* | 10/2003 | Brown | G06F 11/1068 714/763 |
| 2004/0066700 | A1* | 4/2004 | Lee | G11C 7/1021 365/232 |
| 2004/0093457 | A1* | 5/2004 | Heap | G06F 12/0607 711/5 |
| 2004/0177210 | A1* | 9/2004 | Choi | G11C 5/066 711/5 |
| 2010/0238705 | A1* | 9/2010 | Kim | G11C 7/1006 365/148 |
| 2011/0258395 | A1* | 10/2011 | Chan | G11C 7/22 711/142 |
| 2013/0100737 | A1* | 4/2013 | Kwak | H01L 27/1157 365/185.11 |
| 2015/0121035 | A1* | 4/2015 | Steele, Jr. | G06F 12/1018 711/216 |
| 2015/0220275 | A1* | 8/2015 | Oh | G06F 3/0679 711/103 |
| 2015/0302904 | A1* | 10/2015 | Yoon | G11C 5/04 711/105 |
| 2017/0192901 | A1* | 7/2017 | Coffin | G06F 12/10 |
| 2019/0214066 | A1* | 7/2019 | Nakaoka | G11C 11/4091 |
| 2019/0272100 | A1* | 9/2019 | Yu | G11C 5/02 |

OTHER PUBLICATIONS

A. Seznec and J. Lenfant, "Interleaved parallel schemes," in IEEE Transactions on Parallel and Distributed Systems, vol. 5, No. 12, pp. 1329-1334, Dec. 1994, doi: 10.1109/71.334907. (Year: 1994).*

* cited by examiner

APPARATUS AND METHOD TO ACCESS A MEMORY LOCATION

FIELD OF THE DISCLOSURE

The present disclosure relates in general to memory macros and, more particularly, to accessing memory locations in memory arrays.

BACKGROUND

The semiconductor integrated circuit (IC) industry has developed a wide variety of devices to address issues in a number of different areas. Some of these devices, such as memory macros, are configured for the storage of data. Many IC's include hundreds of devices on a single chip. As such, device size is an important IC design consideration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
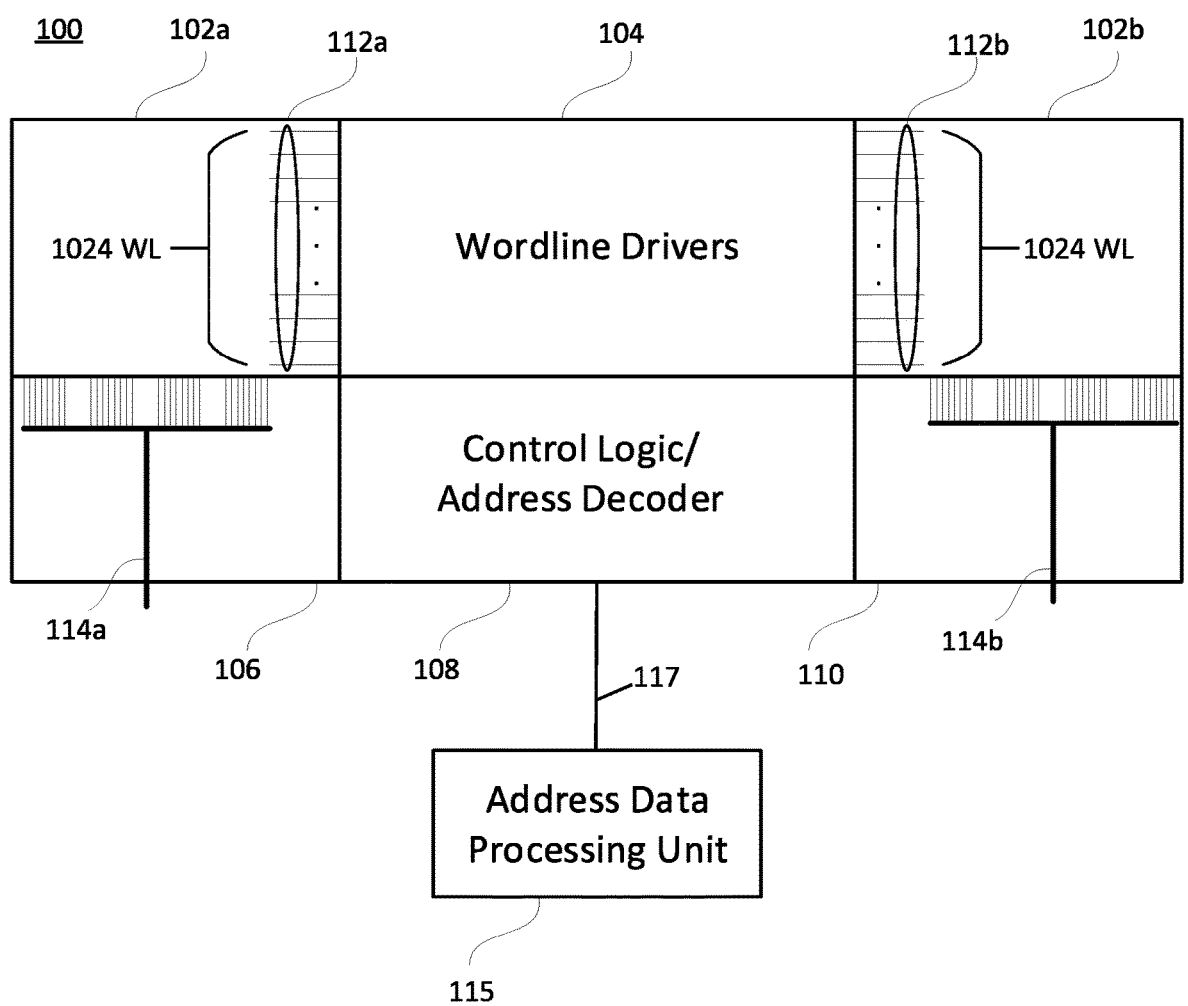
FIG. 1A is an illustration of an embodiment of a memory macro of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature near or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1A is an illustration of an embodiment of a memory macro 100 of the present disclosure. The memory macro 100 includes two memory arrays 102a and 102b. Memory arrays 102a and 102b each include a respective array of wordlines 112a and 112b. In the illustrated embodiment, each memory array 102a and 102b has 1,024 wordlines. However, memory arrays of embodiments of the memory macro 100 are not limited to 1,024 wordlines. For example, each memory array 102a and 102b may have more or less than 1,024 wordlines. The wordlines of each array of wordlines 112a and 112b are driven by wordline drivers of a wordline driver section 104, discussed below.

A memory macro may include two memory arrays (as illustrated) or may include more than two memory arrays, each having a respective array of wordlines. In some embodiments, the wordlines of each memory array may be driven by wordline drivers of a shared wordline driver section (as illustrated). In other embodiments, each memory array may be driven by drivers of its respective wordline driver section.

The control logic/address decoder section 108 may decode address data to determine the addresses of the wordlines that are to be driven by the wordline driver section 104. The control logic/address decoder section 108 may receive the address data from another device such as an address data generator and/or processing unit 115. The control logic/address decoder section 108 may decode the address data into corresponding wordline addresses of each memory array 102a and 102b. An address data generator and/or processing unit 115 may include a general processing unit (GPU), a central processing unit (CPU), or other device that generates and/or processes address data for communication to, as an example, control logic and/or an address decoder. As illustrated, the address data may be communicated by way of an address bus 117.

The wordline driver section 104 receives control signals from the control logic/address decoder section 108. The control signals include the addresses of the wordlines that are to be driven by drivers of the wordline driver section 104. The wordline driver section 104 drives addressed wordlines in each array of wordlines 112a and 112b, and the memory macro 100 accesses corresponding memory locations in the memory arrays 102a and 102b. In an embodiment, each memory location corresponds to a wordline, i.e., wordline address. Each memory location may include one or more memory cell(s) configured to store bit(s) and/or byte(s) of binary information. A memory cell may be a flip-flop circuit, a static ram memory circuit, a capacitor, a dynamic ram memory circuit, or other circuit or device configured to store a binary value, such as but not limited to, a bit value or multi-bit value.

Data may be read from or written to the memory locations by way of data path sections 106 and 110. In the illustrated embodiment, the data path sections 106 and 110 each include data lines 114a and 114b. The data lines 114a and 114b may include, by way of example, bit lines and/or data busses to communicate data between the memory locations and an external device (not show) such as, by way of example and not limitation, a GPU or CPU.

In an embodiment, the number of bit lines of the data lines 114a may correspond to the number of data bits in the memory location(s) associated with a wordline (within array of wordlines 112(a)) that is driven by the wordline driver section 104. Likewise, the number of bit lines of data lines 114*b* may correspond to the number of data bits in the memory location(s) associated with a wordline (within array of wordlines 112(*b*)) that is driven by the wordline driver section 104. The number of data bits in each memory location may be 32, 64, 128, or another number. As an example, if the number of data bits in each memory location of memory array 102*a* and memory array 102*b* is 64 (e.g., eight 8-bit bytes), a read operation will return 128 data bits (sixteen 8-bit bytes) via data lines 114*a* and 114*b*. In some embodiments, the number of data bits in the memory locations of memory array 102*a* may be greater or less than the number of data bits in the memory locations of memory array 102*b*.

Figure 1B:
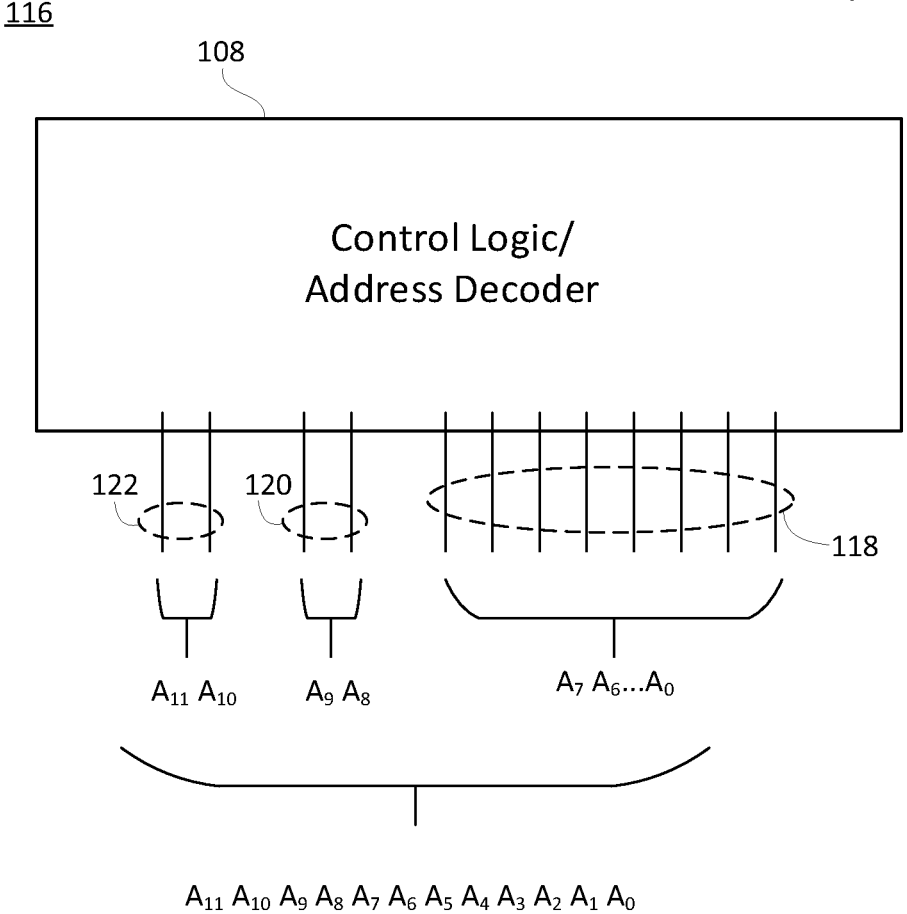
FIG. 1B illustrates address information received by an embodiment of control logic of the memory macro of FIG. 1A.

For clarity of discussion, FIG. 1B is an illustration 116 of labeled address bit lines 118, 120, and 122 of an embodiment of the control logic/address decoder 108. In the illustrated embodiment, the control logic/address decoder 108 is electrically coupled to twelve address bit lines, labeled $A_0$-$A_{11}$. In FIG. 1B, the twelve address bit lines shown may represent twelve individual address bit lines, an address bus having twelve address bit lines, an address bus having less than twelve address bit lines that utilizes a multiplexed address scheme, or may represent other address communication mechanism(s). In some embodiments, a control logic/address decoder may have more than twelve address bit lines. In some embodiments, a control logic/address decoder may have less than twelve address bit lines.

In FIG. 1B, the address data is illustrated as twelve address bits, $A_0$-$A_{11}$. The twelve address bits are illustrated among three sets. However, the presentation of address bits among three sets is provided for clarity of discussion and not limitation. In some embodiments, the address bits may be sequenced in an order other than as illustrated. Moreover, the address bits may be considered individually, as a single set, or sequenced among two, three, four, or more sets. Further, the address bits may be arranged in sets, collections, groups, or other arrangement(s).

In FIG. 1B, address bits $A_0$-$A_7$ are in set 118, address bits $A_8$ and $A_9$ are in set 120, and address bits $A_{10}$ and $A_{11}$ are in set 122. Address bits $A_0$-$A_7$ in conjunction with address bits $A_8$ and $A_9$ identify the address of a wordline within wordline array 112*a*. Address bits $A_0$-$A_7$ in conjunction with address bits $A_{10}$ and $A_{11}$ identify the address of a wordline within wordline array 112*b*. Thus, address bits $A_0$-$A_{11}$ are a single bit-string-array that identifies the addresses of two wordlines—one wordline of wordline array 112*a*, and one wordline of wordline array 112*b*. In contrast, in the related art a single array of address bits (e.g., $B_0$-$B_9$) identifies only one wordline. In the related art, two arrays of address bits are required to identify two wordlines in a memory macro.

In the embodiment illustrated in FIG. 1B, the number of bits in set 118 is greater than the number of bits in each of sets 120 and 122. In other embodiments, the number of bits in set 118 may be equal to the number of bits in each of sets 120 and 122. In yet other embodiments, the number of bits in set 118 may be less than the number of bits in each of sets 120 and 122.

In an embodiment, the number of address lines of an address bus (e.g., address bus 117 in FIG. 1A) need be no greater than the number of address bits that identify wordline addresses in both wordline arrays 112*a* and 112*b*. For example, if the number of address bits in set 118 is eight, the number of address bits in set 120 is two, and the number of address bits in set 122 is two, the number of address lines of an address bus (e.g., address bus 117) need be no greater than the sum of the number of address bits in each set, i.e., no greater than twelve in the illustrated embodiment. Such an address bus may be implemented to efficiently utilize space because the width of the address bus need be no greater than that required to identify, by way of a single bit-string-array, wordline addresses in both wordline arrays 112*a* and 112*b*. In some embodiments that utilize a multiplexed address scheme, the number of address lines of an address bus may be less than the number of address bits that identify wordline addresses in both wordline arrays 112*a* and 112*b*. In other embodiments, the number of address lines of an address bus may be greater than the number of address bits that identify wordline addresses in both wordline arrays 112*a* and 112*b*. In yet other embodiments, an address bus may include data lines in addition to the address lines. The data lines may carry data signals such as control signals, status signals, or other information signals.

In contrast, in the related art the number of address lines of an address bus is at least the sum of the number of address bits required to identify a wordline in a wordline array, and the number of address bits required to identify a wordline in another wordline array. For example, if the number of address bits required to identify a wordline in wordline array 112*a* is ten, and the number of address bits required to identify a wordline in wordline array 112*b* is ten, in the related art an address bus twenty address lines in width is required to communicate the total number (in this example, twenty) of address bits required to identify both wordlines.

Figures 1C, 1D:
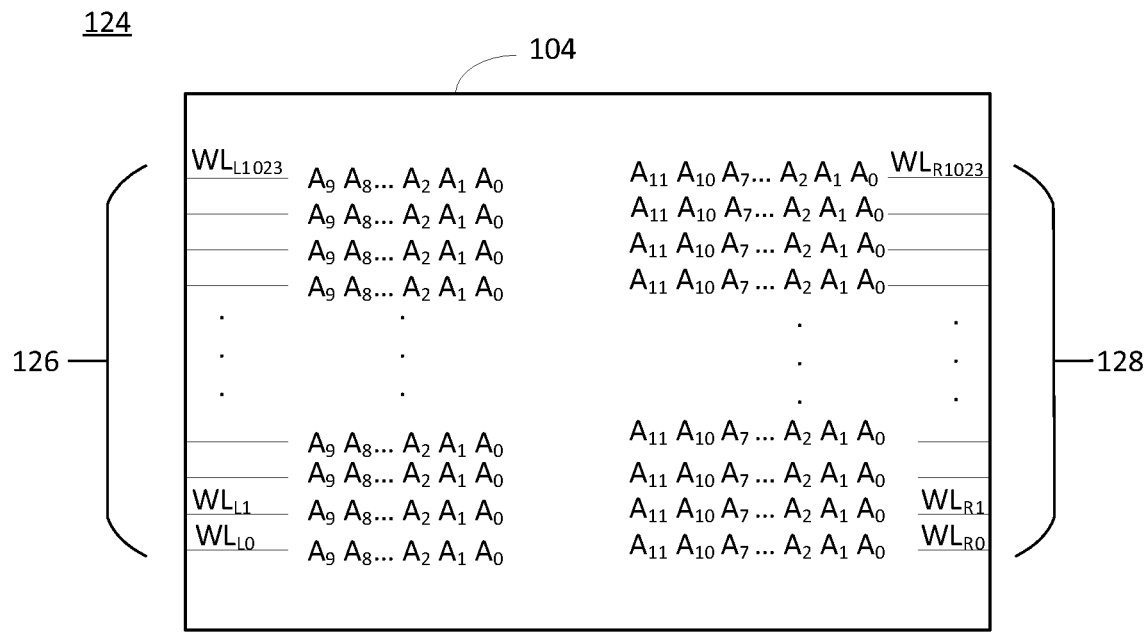
FIG. 1C illustrates wordline addresses of an embodiment of a wordline driver section of the memory macro of FIG. 1A.
FIG. 1D illustrates wordline address composition of an embodiment of the control logic of the memory macro of FIG. 1A.

FIG. 1C is an illustration 124 of wordline addresses of an embodiment of the wordline driver section 104. The wordlines 126 depicted at the left side of wordline driver section 104 are labeled $WL_{L0}$-$WL_{L1023}$. The addresses of the wordlines 126 at the left side correspond to address bits $A_0$-$A_7$, $A_8$ and $A_9$. The wordlines 128 at the right side of wordline driver section 104 are labeled $WL_{R0}$-$WL_{R1023}$. The addresses of the wordlines 128 at the right side correspond to address bits $A_0$-$A_7$, $A_{10}$ and $A_{11}$. Thus, address bits $A_0$-$A_{11}$ identify the addresses of two wordlines—one wordline of wordline array 112*a*, and one wordline of wordline array 112*b*.

FIG. 1D is an illustration 130 of an embodiment of wordline address composition of the control logic/address decoder 108. FIG. 1D is provided for clarity of discussion of address composition, and not limitation. Address composition of two wordlines based on a single bit-string-array may take forms other than that demonstrated in FIG. 1D. For example, wordline address composition may be derived directly or indirectly from address data received by memory macro 100. Moreover, in some embodiments address composition is performed by reading address bits received by control logic and/or an address decoder, processing the received address bits, and generating a wordline address. Address composition may be performed by a digital circuit, such as a logic circuit and/or other circuit configured to receive address data and generate one or more memory addresses.

As illustrated in FIG. 1D, address bits $A_0$-$A_7$ are combined with address bits $A_8$ and $A_9$ by way of data line 132 to provide wordline address $A_0$-$A_7$ $A_8$ $A_9$. Address bits $A_0$-$A_7$ are combined with address bits $A_{10}$ and $A_{11}$ by way of data line 134 to provide wordline address $A_0$-$A_7$ $A_{10}$ $A_{11}$. The composition of two wordline addresses may occur in parallel, or substantially in parallel, to facilitate retrieval of data sets from each memory array 102*a* and 102*b* at the same time, or at substantially the same time. In another embodiment, data sets from each memory array 102*a* and 102*b* are retrieved at different times (e.g., sequentially).

Figure 1E:
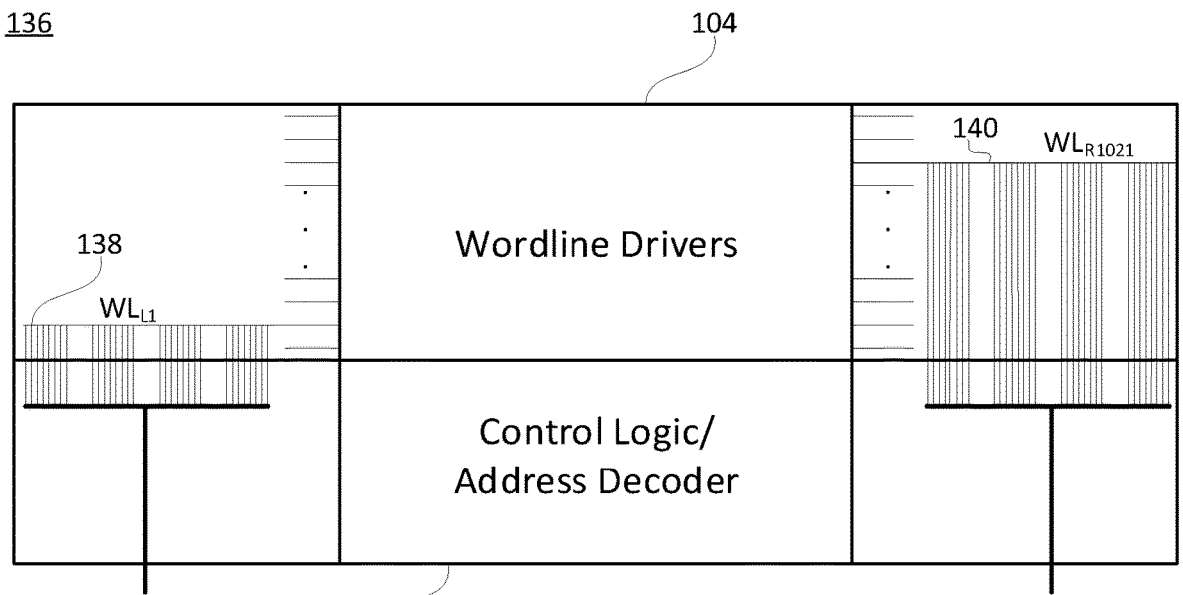
FIG. 1E is an illustration of wordline addressing of two memory arrays of the memory macro of FIG. 1A.

FIG. 1E is an illustration 136 of two wordlines $WL_{L1}$ 138 and $WL_{R1021}$ 140 referenced by single bit-string-array $A_0$-$A_{11}$. As illustrated, $WL_{L1}$ 138 and $WL_{R1021}$ 140 are in different rows of each memory array 102a and 102b. $WL_{L1}$ 138 may correspond to wordline address $A_0$-$A_7$ $A_8$ $A_9$, and $WL_{R1021}$ 140 may correspond to wordline address $A_0$-$A_7$ $A_{10}$ $A_{11}$. For example, $WL_{L1}$ 138 may be the second wordline row in memory array 102a, and $WL_{R1021}$ 140 may be the 1,022 wordline row in memory array 102b.

Figure 1F:
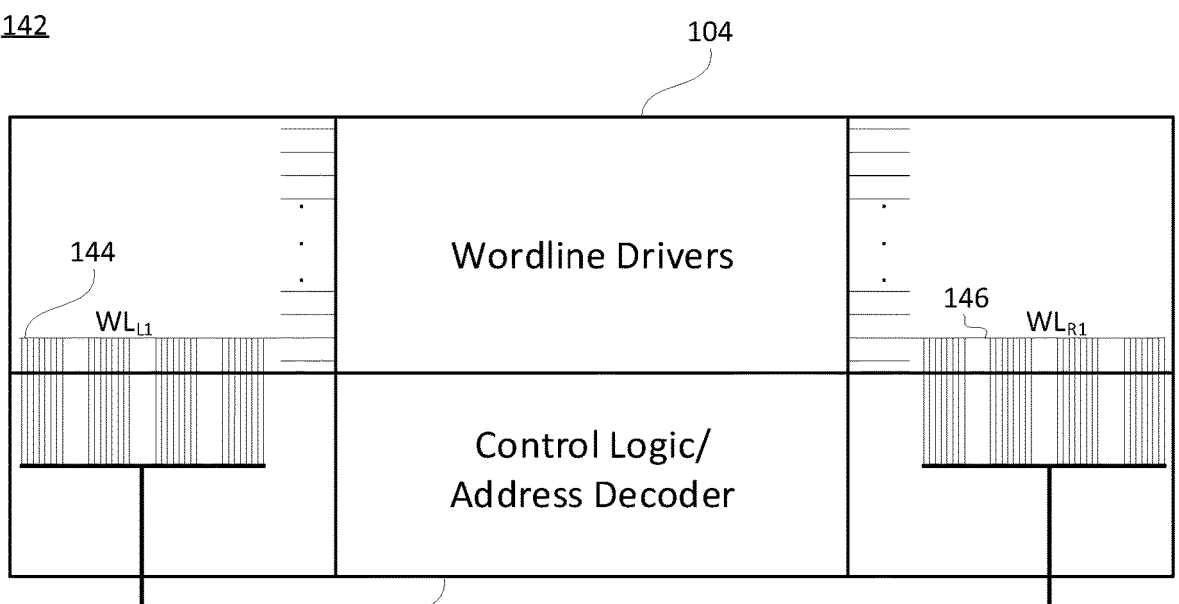
FIG. 1F is an illustration of wordline addressing of two memory arrays of the memory macro of FIG. 1A.

As another example, FIG. 1F is an illustration 142 of two wordlines $WL_{L1}$ 144 and $WL_{R1}$ 146 referenced by single bit-string-array $A_0$-$A_{11}$. As illustrated, $WL_{L1}$ 144 and $WL_{R1}$ 146 are in the same numbered row in each memory array 102a and 102b. $WL_{L1}$ 144 may correspond to wordline address $A_0$-$A_7$ $A_8$ $A_9$, and $WL_{R1}$ 146 may correspond to wordline address $A_0$-$A_7$ $A_{10}$ $A_{11}$. For example, $WL_{L1}$ 144 may be the second wordline row in memory array 102a, and $WL_{R1}$ 146 may be the second wordline row in memory array 102b.

FIGS. 1E and 1F illustrate that a single bit-string-array may reference wordlines that are in the same or in different numbered rows of memory arrays 102a and 102b.

Figure 2:
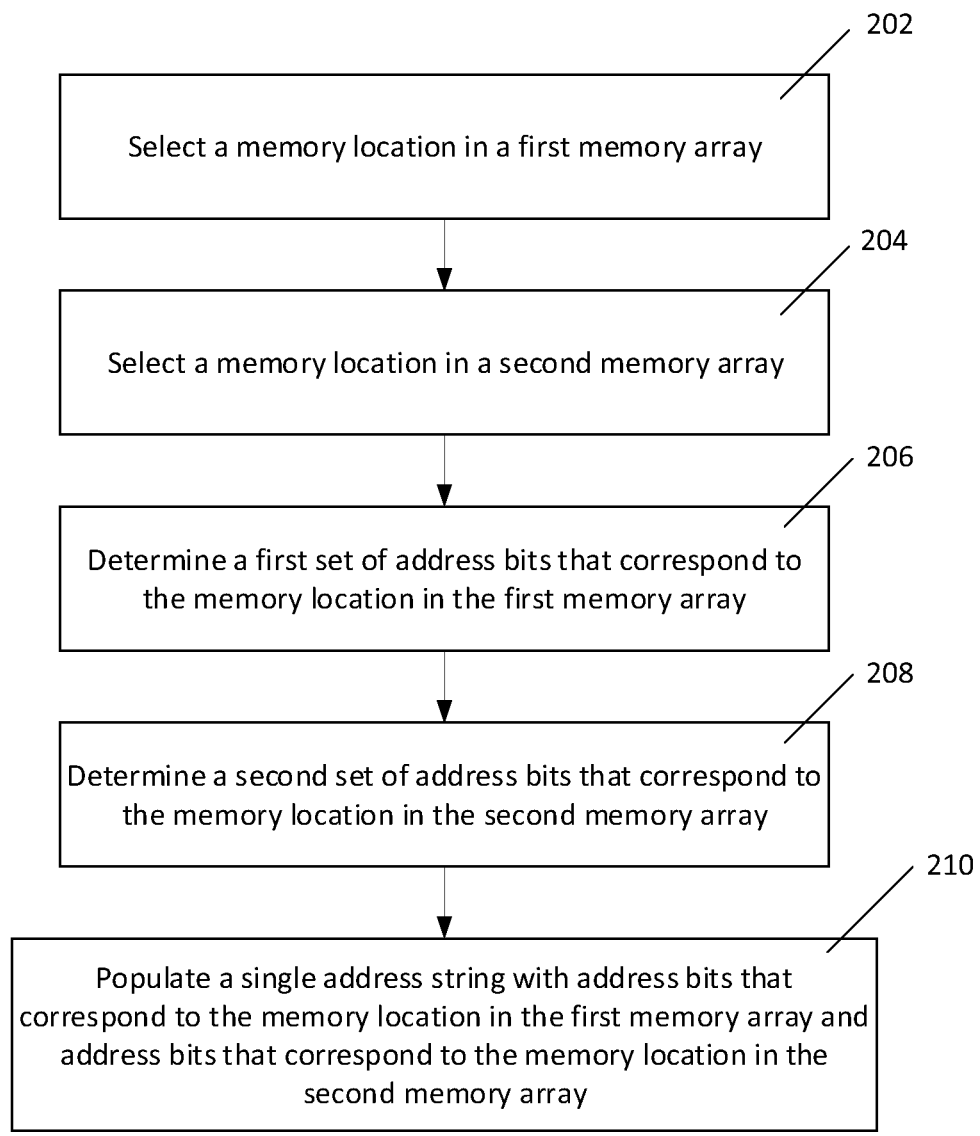
FIG. 2 is a flowchart of an embodiment of a method of the present disclosure to populate an address string.

FIG. 2 is a flowchart of an embodiment of a method 200 of the present disclosure to populate an address string, such as a single bit-string-array. One or more of the steps of the method 200 may be performed by a device that processes address data, such as a general processing unit (GPU), a central processing unit (CPU), or other device that processes address data.

At 202, a memory location in a first memory array is selected. The memory location may correspond to a wordline in the first memory array. At 204, a memory location in a second memory array is selected. The memory location may correspond to a wordline in the second memory array. At 206, a first set of address bits that corresponds to the memory location in the first memory array is determined. At 208, a second set of address bits that corresponds to the memory location in the second memory array is determined. At 210, a single address string is populated with address bits that correspond to the memory location in the first memory array and address bits that correspond to the memory location in the second memory array. The single address string may include address bits that are common to address bits that correspond to the memory location in the first memory array and the memory location in the second memory array. The single address string may also include address bits that are not common to the memory location in the first memory array and the memory location in the second memory array.

In other embodiments, the method 200 may be performed in an order other than that illustrated in FIG. 2, and/or may exclude steps and/or include additional steps. For example, a method to populate an address string may include selecting wordlines from each memory array that have common address bits.

Figure 3:
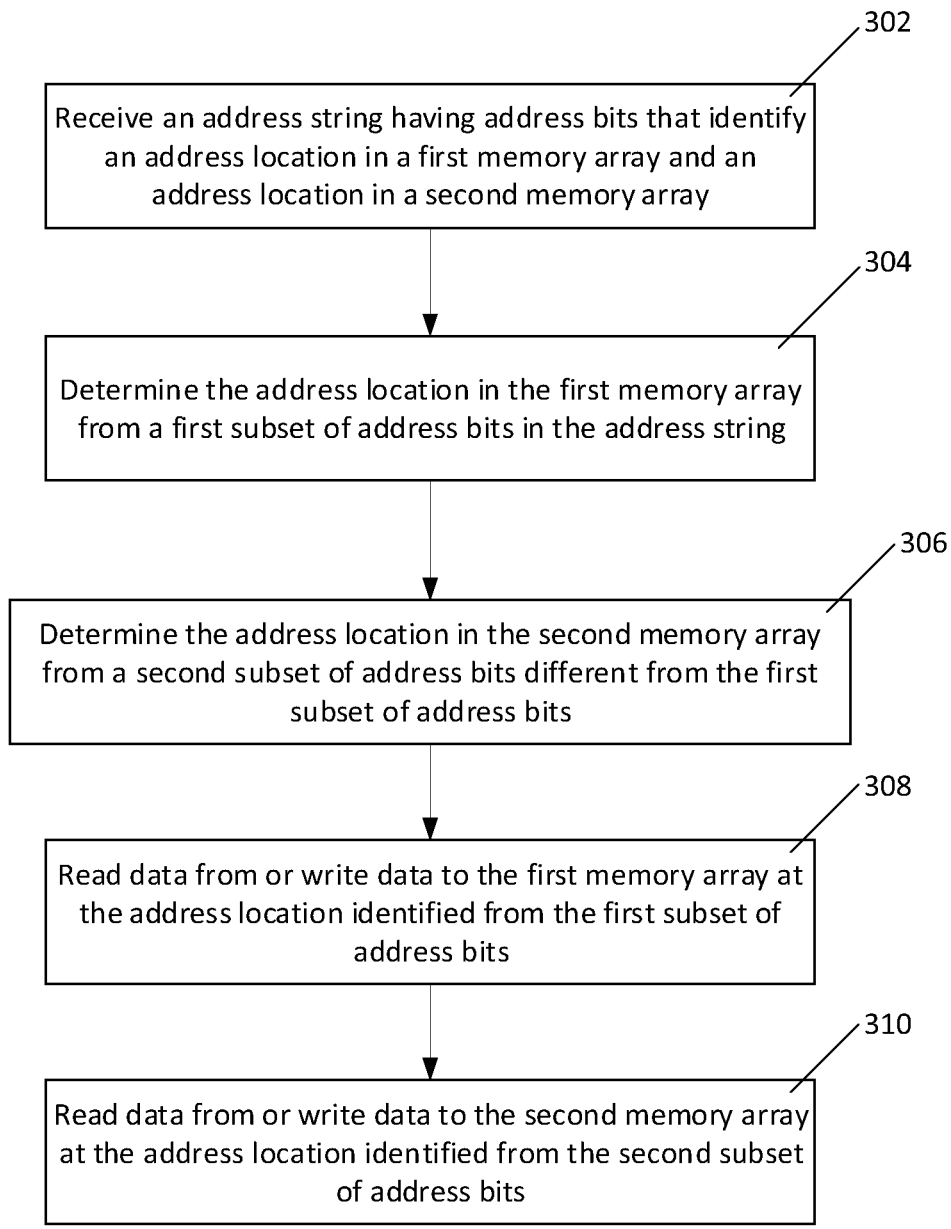
FIG. 3 is a flowchart of an embodiment of a method to perform data operations at different address locations determined from a single address string.

FIG. 3 is a flowchart of an embodiment of a method 300 to perform data operations at different address locations determined from a single address string. The method 300 may be performed by a memory macro, as an example.

At 302, an address string having address bits that identify an address location in a first memory array and an address location in a second memory array is received. At 304, the address location in the first memory array is determined from a first subset of address bits in the address string. At 306, the address location in the second memory array is determined from a second subset of address bits in the address string. At 308, data is read from or written to the first memory array at the address location identified from the first subset of address bits. At 310, data is read from or written to the second memory array at the address location identified from the second subset of address bits.

In other embodiments, the method 300 may be performed in an order other than that illustrated in FIG. 3, and/or may exclude steps and/or include additional steps. For example, a method to perform data operations at different address locations determined from a single address string may include concatenating address bits from specific sets of address bits to determine the wordline addresses. In other embodiments, each subset of address bits may identify a respective wordline address without concatenating address bits. The method may further, or alternatively, include performing refresh and/or erase operations at the memory locations determined from the address string.

Figure 4:
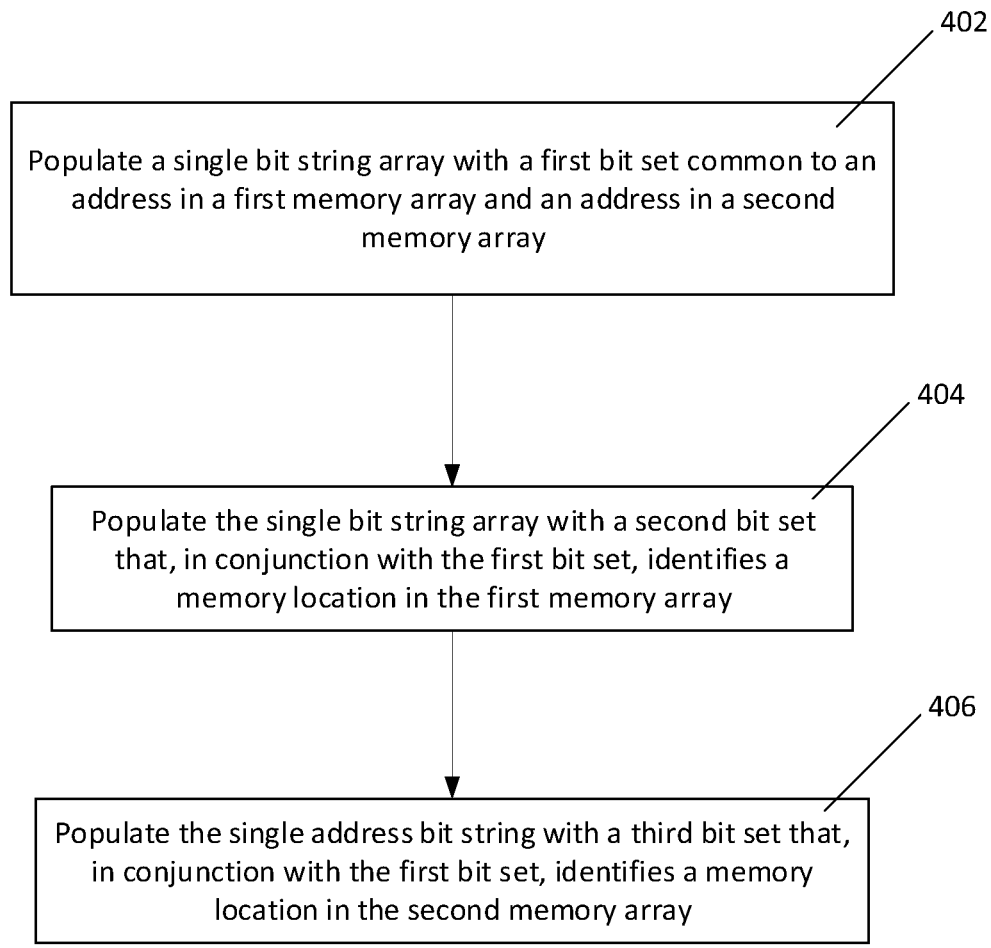
FIG. 4 is a flowchart of an embodiment of a method to populate a single address string with multiple memory addresses.

FIG. 4 is a flowchart of an embodiment of a method 400 to populate a single address string with multiple memory addresses. One or more of the steps of the method 400 may be performed by a device that processes address data, such as a general processing unit (GPU), a central processing unit (CPU), or other device that processes address data.

At 402, a single bit-string-array is populated with a first bit set common to an address in a first memory array and an address in a second memory array. At 404, the single bit-string-array is populated with a second bit set that, in conjunction with the first bit set, identifies a memory location in the first memory array. At 406, the single bit-string-array is populated with a second bit set that, in conjunction with the first bit set, identifies a memory location in the second memory array.

In other embodiments of a method to populate a single address string with multiple memory addresses may include arranging the address bits as collections, groups, or other types of arrangement(s). The method may include determining whether the identified memory locations are within a specific or otherwise defined range of rows, and/or in the same numbered row.

In one example configuration, there is a method, comprising: determining a first set of address bits common to an address of a first memory location and to an address of a second memory location in a memory macro; determining a second set of address bits of the address of the first memory location; determining a third set of address bits of the address of the second memory location; and concatenating the first, second, and third sets of address bits to a single bit string.

In another example configuration, there is a method, comprising: receiving an address string; determining, from the address string, a first address of a first wordline in a first memory array of a memory macro; and determining, from the address string, a second address of a second wordline in a second memory array of the memory macro.

In a yet further example configuration, there is an apparatus, comprising: an address decoder configured to receive an address string, parse the address string into a first address of a first wordline in a first memory array, and parse the address string into a second address of a second wordline in a second memory array; and a wordline driver section of a memory macro, the wordline driver section electrically coupled to the address decoder and configured to receive the first address of the first wordline, and receive the second address of the second wordline.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    determining a first set of address bits common to an address of a first memory location and to an address of a second memory location in a memory macro;
    determining a second set of address bits of the address of the first memory location;
    determining a third set of address bits of the address of the second memory location; and
    concatenating the first, second, and third sets of address bits to a single bit string.

2. The method of claim 1, wherein the first and second sets of address bits identify a first wordline of the first memory location, and the first and third sets of address bits identify a second wordline of the second memory location.

3. The method of claim 1, wherein the first memory location is within a first memory array, and the second memory location is within a second memory array that is different from the first memory array.

4. The method of claim 1, wherein the third set of address bits is identical to the second set of address bits.

5. The method of claim 1, wherein the third set of address bits is different from the second set of address bits.

6. The method of claim 1, wherein a number of bits of the third set of address bits is equal to a number of bits of the second set of address bits.

7. The method of claim 6, wherein a number of bits of the first set of address bits is greater than the number of bits of the third set of address bits.

8. The method of claim 1, further comprising communicating the single bit string to an address bus.

9. The method of claim 8, wherein the address bus has a number of bus lines no greater than a sum of a number of bits of the first set of address bits, a number of bits of the second set of address bits, and a number of bits of the third set of address bits.

10. A method comprising:
    receiving an address string;
    determining, from the address string, a first address of a first wordline in a first memory array of a memory macro;
    determining, from the address string, a second address of a second wordline in a second memory array of the memory macro;
    determining the first address of the first wordline comprises concatenating a first set of bits of the address string with a second set of bits of the address string; and
    determining the second address of the second wordline comprises concatenating the first set of bits of the address string with a third set of bits of the address string.

11. The method of claim 10, further comprising:
    retrieving data bits from a first memory location in the first memory array, wherein the first memory location corresponds to the first wordline; and
    retrieving data bits from a second memory location in the second memory array, wherein the second memory location corresponds to the second wordline.

12. The method of claim 10, further comprising:
    parsing the address string to:
        determine the first address of the first wordline, and
        determine the second address of the second wordline.

13. The method of claim 10 wherein the third set of bits is different from the second set of bits.

14. The method of claim 10, further comprising:
    reading data from a first memory location that corresponds to the first wordline; and
    reading data from a second memory location that corresponds to the second wordline.

15. An apparatus, comprising:
    an address decoder configured to:
        receive an address string,
        parse the address string into a first address of a first wordline in a first memory array, and
        parse the address string into a second address of a second wordline in a second memory array;
    a wordline driver section of a memory macro, wherein the wordline driver section is electrically coupled to the address decoder and configured to:
        receive the first address of the first wordline, and
        receive the second address of the second wordline;
    an address data processing unit; and
    an address bus electrically coupled to the address decoder and to the address data processing unit, and
    wherein the address data processing unit is configured to:
        determine a first set of bits that are common to an address of a first memory location and to an address of a second memory location in a memory macro;
        determine a second set of bits of the address of the first memory location;
        determine a third set of bits of the address of the second memory location; and
        concatenate the first, second, and third sets of address bits to form the address string.

16. The apparatus of claim 15, wherein the first and second sets of bits identify the first wordline, and the first and third sets of bits identify the second wordline.

17. The apparatus of claim 15, wherein the third set of bits is different from the second set of bits.

18. The apparatus of claim 15, wherein the third set of bits is the same as the second set of bits.

* * * * *